US009311767B2

(12) United States Patent
Leung et al.

(10) Patent No.: US 9,311,767 B2
(45) Date of Patent: Apr. 12, 2016

(54) SYSTEM FOR STORAGE SHELVING AND METHODS OF USE THEREOF

(75) Inventors: Wallace Woon-Fong Leung, Kowloon (CN); King-Lun Kwok, Kowloon (CN); Mau-Wah Chan, Kowloon (CN); So-Lam Sze, Kowloon (CN)

(73) Assignee: The Hong Kong Polytechnic University, Hung Hom, Kowloon (HK)

( * ) Notice: Subject to any disclaimer, the term of this patent is extended or adjusted under 35 U.S.C. 154(b) by 621 days.

(21) Appl. No.: 12/078,359

(22) Filed: Mar. 31, 2008

(65) Prior Publication Data

US 2009/0243797 A1 Oct. 1, 2009

(51) Int. Cl.
*G05B 19/00* (2006.01)
*G07F 11/38* (2006.01)
*G07F 17/00* (2006.01)

(52) U.S. Cl.
CPC ............ *G07F 11/38* (2013.01); *G07F 17/0092* (2013.01)

(58) Field of Classification Search
CPC . G06F 19/322; G06F 19/324; G06F 19/3418; G06F 19/3462; G07F 11/38; G07F 17/0092; G07F 11/002; H04B 1/00; G05B 19/00
USPC ............ 340/5.73, 539.2, 5.9, 5.2, 5.22, 5.31; 70/85; 312/209, 128, 234.1
See application file for complete search history.

(56) References Cited

U.S. PATENT DOCUMENTS

| | | | | |
|---|---|---|---|---|
| 5,593,267 | A * | 1/1997 | McDonald et al. | 414/273 |
| 6,040,771 | A * | 3/2000 | Kim | 340/545.1 |
| 6,313,745 | B1 * | 11/2001 | Suzuki | 340/572.1 |
| 7,887,146 | B1 * | 2/2011 | Louie et al. | 312/209 |
| 2006/0232381 | A1 * | 10/2006 | Gauthier | 340/5.73 |
| 2008/0088454 | A1 * | 4/2008 | Flores et al. | 340/572.4 |
| 2008/0117053 | A1 * | 5/2008 | Maloney | 340/572.4 |
| 2009/0026907 | A1 * | 1/2009 | Davidowitz et al. | 312/407 |
| 2009/0212907 | A1 * | 8/2009 | Colley, III | 340/5.73 |

* cited by examiner

*Primary Examiner* — Nabil Syed
(74) *Attorney, Agent, or Firm* — Barlow, Josephs & Holmes, Ltd.

(57) ABSTRACT

The present invention relates to a system for product storage and methods of categorizing, storing, and delivering products to end users via the system, the system's components including a processor, a "smart shelving" device, boxes for insertion into and utilization by the "smart shelving" device, and ID readers. Through the present invention, products are able to be securely and more certainly delivered to the proper recipient of the products.

18 Claims, 3 Drawing Sheets

SYSTEM FOR STORAGE SHELVING AND METHODS OF USE THEREOF

BACKGROUND

The most important aspect of any pharmacy operation is the delivery of medications to the patient. Traditionally, prescriptions were filled by a pharmacy and delivered to a dispensing station. However, as the volume of orders/prescriptions increased, new methods were required. In one example, the "floor stock system" was a miniature pharmacy created at a distance location, where the operator interpreted a physicians order and dispensed the drugs without the aid of the pharmacist. However, this model resulted in a number of errors, such as dose errors. In another way, the volume of orders at times resulted in the wrong patient receiving the wrong drug.

Some systems in the prior art, for example U.S. Pat. No. 5,907,493, try to limit errors within a pharmacy by decreasing the ability of a pharmacist to directly control the system, instead relying upon a computer to direct the pharmacist. However popular belief holds that a pharmacist should maintain control over the dispensing system.

Through the system and methods of the present invention, the disadvantages and problems in the prior art can be overcome.

DESCRIPTION

The present invention relates to a system for product storage and methods of categorizing, storing, and delivering products to end users via the system, the system's components including a processor, a "smart shelving" device, boxes for insertion into and utilization by the "smart shelving" device, and ID readers. Through the present invention, products are able to be securely and more certainly delivered to the proper recipient of the products.

These and other features, aspects, and advantages of the apparatus and methods of the present invention will become better understood from the following description, appended claims, and accompanying drawings where:

The following description of certain exemplary embodiment(s) is merely exemplary in nature and is in no way intended to limit the invention, its application, or uses. Throughout this description, the term "pharmacy" shall refer to a location wherein products having a health affect on humans are dispersed.

Figure 1:
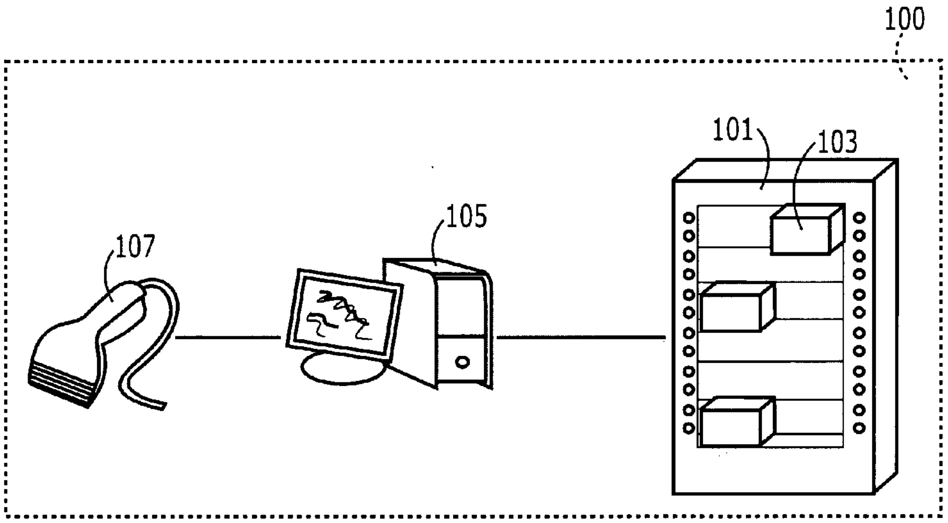
FIG. 1 shows the components of the present invention.

Now, to FIGS. 1-5,

FIG. 1 is an embodiment of the system 100 of the present invention, including a "smart shelving" device 101 (i.e., "shelving device"), storage boxes 103 for utilization by the shelving device 101, a processor 105, and an ID reader 107.

The processor 105 suitable for use herein can include as components microprocessors, memory (both temporary and permanent), power supply, digital components, displays, user interfaces devices such as a keyboard, a mouse, printer, and the like. The processor 105 can also include algorithms suitable for facilitating and controlling the system 100. The processor 105 serves to communicate with the controller boards of the shelving device and ID reader 107 for obtaining required information. The processor 105 will go through different states and each state is controlled by the processor 105 based on the collected information. The status and location of the storage boxes 103 are also monitored.

The "smart shelving" device 101 is, physically, a cabinet possessing multiple slots for accepting the storage boxes 103. The device 101 is equipped with controller boards, readers, and actuation modules (not shown). The cabinet can be fully or partially enclosed. Controller boards with the device 101 serve to control readers, visual indicates, audio indicators, lock sensors, and electro-mechanical lockers. Through the controller boards, the storage boxes 103, are able to be sensed when within the device 101, lock the boxes 103 when within the device 101, or notify the user as the boxes 103 status. A reader or sensor is also included in the device 101, primarily for reading the ID of the box 103 after it is inserted into a slot of the device 101. The ID may be a barcode strip, a radio frequency, or a mechanical ID. An actuation module is involved in physically locking the box 103 when inserted into the device 101. Locking can occur by cylinder lock, deadbolt, disc tumbler lock, electronic lock, solenoid lock, and the like. In one embodiment, the box 103 is locked by an activation module when it is pushed "completely" into the slot of the device 101. Locking occurs by the box 103 mechanically triggering a switch to allow the lock to fall into place. The lock sensor will inform the controller board about the box locking status. The box 103 can be unlocked by sending a signal to the lock from the processor 105.

The storage box 103 for use with the "smart shelving" device 101 can be either partially or fully closed, and be of any dimension suitable to hold the product of interest, for example drugs, jewels, samples, plants, animals, corpses, herbs, foodstuffs, etc. The box 103 contains a unique ID, such as but not limited to barcode ID, RFID, Mechanical ID, and the like. ID's as taught in U.S. Pat. Nos. 3,859,624, 3,878,528, 3,878,528, 4,095,214, 4,354,099, 4,475,481, 4,549,624, and 4,739,828, incorporated herein by reference, are suitable for use in the present system.

The reader 107 is suitable for obtaining ID information from the object. This can be done by attaching a unique ID to the object, such ID possessing a coded form of characteristics of the object, for example color, size, weight, purity, chemical composition, qualitative characteristics, quantitative characteristics, analytical characteristics, and the like. The reader can include interrogators, barcode readers, scanners, lasers, etc. In general, the interrogators can consist of circuitry to communicate with the ID container, a micro processor to check and decode data, and storage means for storing date. The interrogator may also include a power source for distributing communication. Interrogators as set forth in U.S. Pat. No. 6,917,291, incorporated herein by reference, are suitable for use in the present invention. The reader 107 can be connected via wired or wireless means to the processor 105 for the passage of data thereto.

Figure 2:
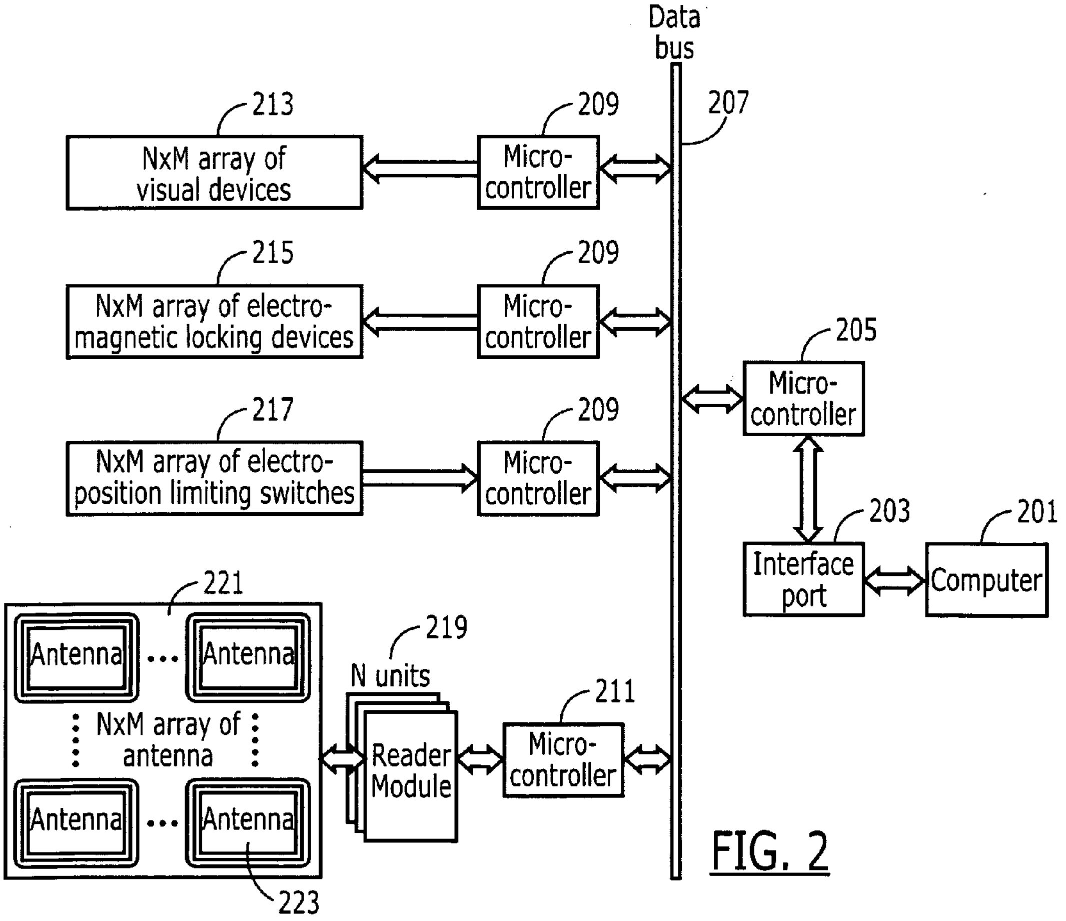
FIG. 2 shows a schematic of the various components, and their relation to one another, in the present invention.

FIG. 2 is a schematic for the system as communication occurs between the ID reader, the "smart shelving" device, and the processor.

In the schematic embodiment, the processor 201, a computer, is in communication with the ID reader and "smart shelving" via an interface port 203 and microcontroller 205. Communication between the processor 201 and the other two components occurs through a bus 207.

The ID Reader operates by a reader module 219, such module 219 which communicates back and forth between ID antennas 221. The ID antennas 221 are coupled to storage boxes for insertion into the "smart shelving" device. Upon reading the ID, data from the ID antennas 221 are forwarded throughout the system via a microcontroller 211 positioned in communication with the bus 207.

The "smart shelving" device consists primarily of arrays in contact with the system through microcontrollers 209 and the bus 207. One component is an array (N×M) of visual devices 213, for example lighting devices or LEDs, for indicating the status of the storage boxes placed into the shelving device. Another component is an array (N×M) of electromagnetic locking devices 215 that individually lock a storage box when it has been placed in a corresponding slot in the smart shelving device. A further component, an array (N×M) of position detection switches 217, relays to the system via a microcontroller 209, the position of a particular box storage within the smart shelving device.

Figure 3:
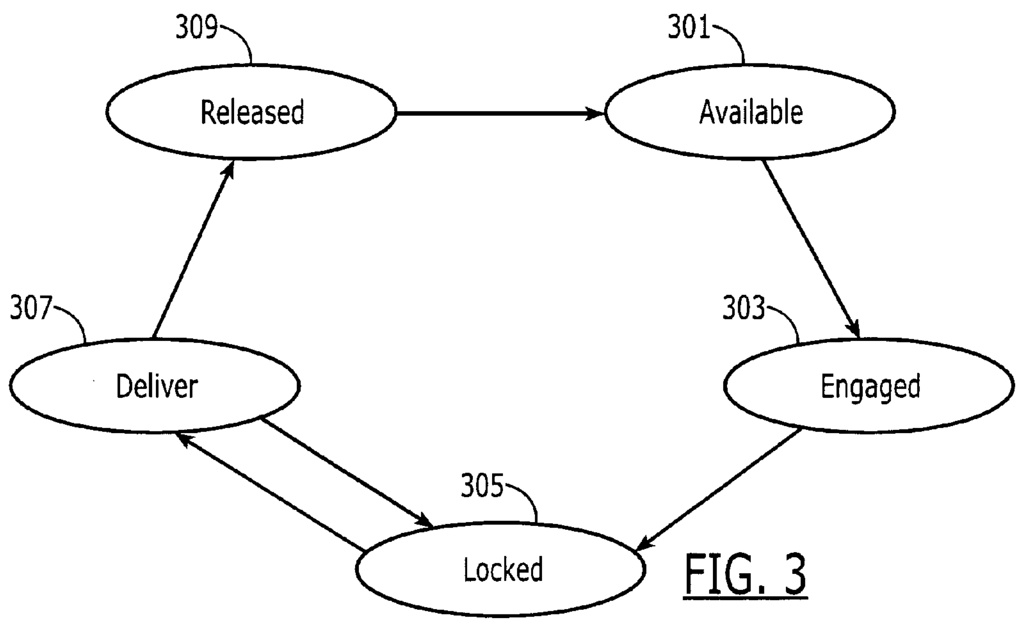
FIG. 3 shows the method of categorizing, storing, and delivering products in accordance with the present invention.

FIG. 3 is an embodiment of a method for storing, securing, and retrieving products within the "smart shelving" device. The method may be embodied in a computer algorithm. In a first step, a storage box is noted available 301 for use by the system. A storage box is deemed available 301 when it is empty of products, or has the ability to accept more products, and the storage box is in good working order. In a next step, the storage box will be engaged 303 by the system. Engagement 303 preferably occurs by reading the unique ID of the storage box. Reading can occur by an ID Reader. In another embodiment, the unique ID may be manually entered into system, for example by typing the unique ID unto a computer. The storage box is then locked 305 into the shelving device, following placing the storage box within the shelving device. Locking may occur automatically when the box is pushed fully into the slot. In another embodiment, the storage box can be manually locked in the shelving device. In one embodiment, the slots of shelving device have one or more LEDs associated with each slot; in one example, when the slot contains a storage box, one LED turns on and one LED turns off. Vice versa occurs when the storage box is removed. Upon the storage box being placed into the shelving device, the ID of the box can be read by a sensor inside the slot.

When the products stored in a storage box are desired, the box is delivered 307 to a user. Prior to delivery, the box is scanned by the ID Reader to ensure it is the appropriate box having the desired products. The box is then unlocked from the shelving device and removed therefrom.

Following partial removal or changing of the product, the storage box can be relocked into the shelving device.

After removal of the complete contents in a storage box, the box will be released 309 by the system, i.e., the box will be released 309 by the system, i.e., the box will no longer be associated with a particular product. The box can now be re-utilized and associated with another product.

EXAMPLES

Figure 4:
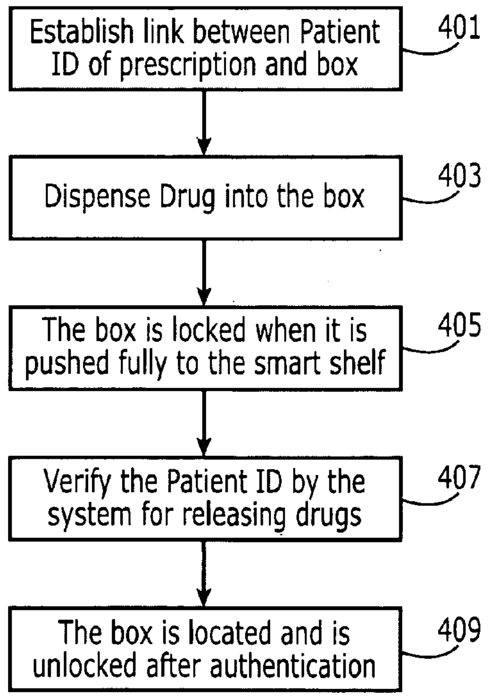
FIG. 4 is an embodiment of the present method, applied to a drug dispensing facility.

In one embodiment, the present invention can be utilized in a pharmacy or drug dispensing environment. FIG. 4 exhibits the method of filling, linking, and storing a storage box within a pharmacy or drug dispensing environment, wherein a first step, following a patient presenting her prescription to a pharmacist or dispenser, a link is established between the prescription and a storage box 401. This can be accomplished by scanning the unique ID of the storage box and obtaining a unique ID from the prescription. The dispenser will then dispense or place the prescribed drug into the box 403.

The box will then be placed into an empty slot or the "smart shelving" device and locked when fully inserted 405. Corresponding visual and/or audio indicators can be turned on, indicating the status of the box.

When the patient is called and comes to the counter to obtain her drugs, the prescription ID held by the patient will be verified 407. If successfully verified, the box will be unlocked from the shelving device and the drugs contained therein delivered to the patient 409.

Figure 5:
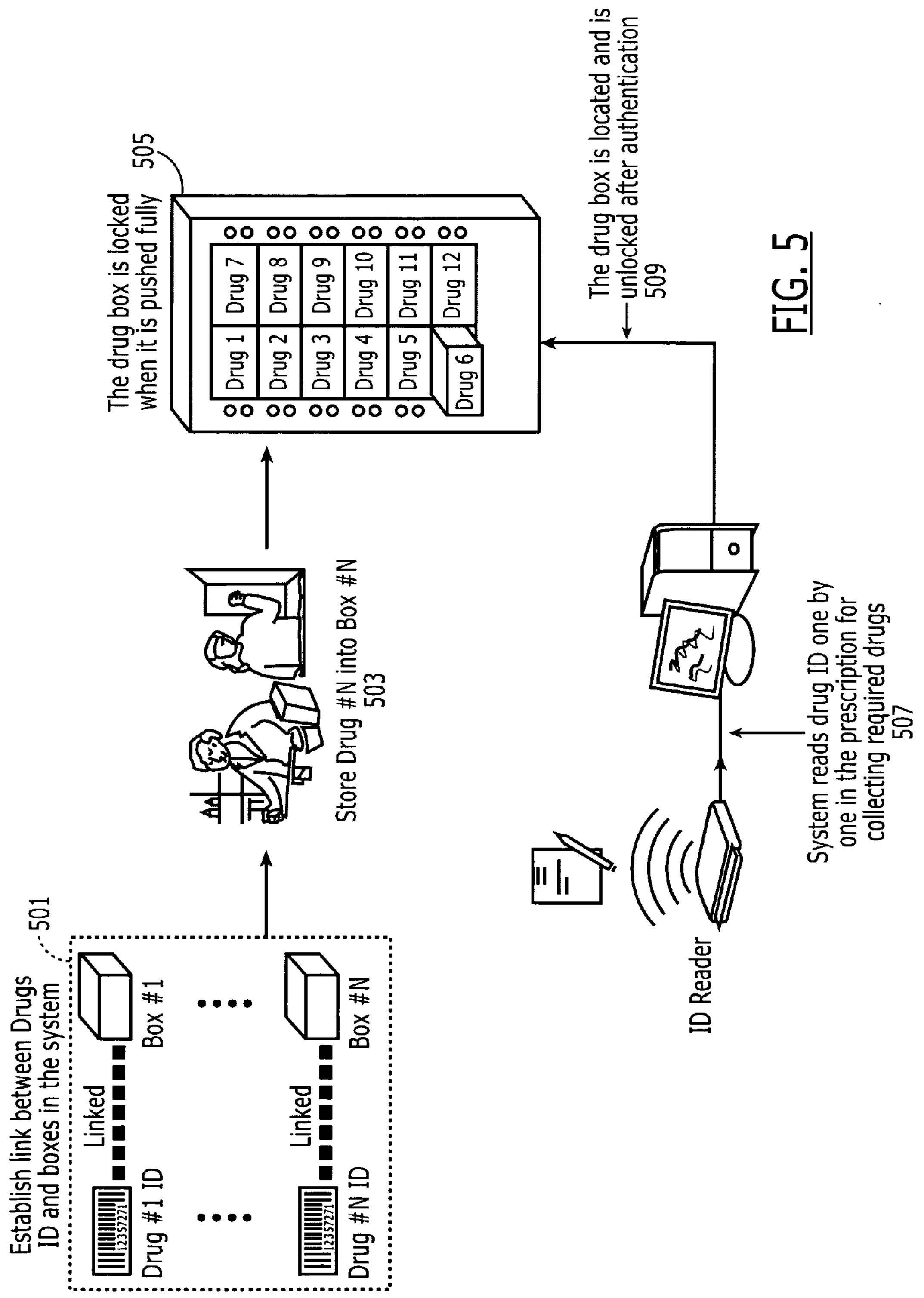
FIG. 5 is an embodiment of the present method, applied to a traditional Chinese medicine pharmacy.

FIG. 5 is an embodiment of the use of the present system in a traditional Chinese medicine pharmacy. As well known, traditional Chinese medicine is considered a complementary or alternative medicine system. Diagnosis in traditional Chinese medicine is based on an overall observation of human symptoms. Treatment often includes food or herbal therapy, wherein a practitioner writes a prescription, immediately following diagnosis, and proceeds to fill the prescription. The prescription is drawn from a host of dried foods and herbs stored in boxes, or modules. Due to the large numbers of foods and herbs available, the boxes are usually stacked on top of one another.

In this embodiment of the invention, the storage boxes are used to hold the varieties of natural ingredients, such as herbs, that are used in traditional Chinese medicine treatment.

In the first step, a ingredient's ID (all ingredients are given particular IDs) are limited to a particular storage box 501. The linkage is stored on the processor. The ingredient is then inserted into a slot of the smart shelving device 505, scanned by a sensor in the slot, and locked.

Upon receipt of a prescription, the prescription is scanned via on ID reader 507 and via the processor, the appropriate ingredient boxes are automatically unlocked 509. The ingredient boxes are preferably unlocked one by one to avoid confusion of the amount of each ingredient to be used. Following removal of contents, the box is re-inserted back into an empty slot for further use. In the event the box has been fully emptied, it will be released by the system for further use by another ingredient.

Having described embodiments of the present system with reference to the accompanying drawings, it is to be understood that the present system is not limited to the precise embodiments, and that various changes and modifications may be effected therein by one having ordinary skill in the art without departing from the scope or spirit as defined in the appended claims.

In interpreting the appended claims, it should be understood that:

a) the word "comprising" does not exclude the presence of other elements or acts than those listed in the given claim;

b) the word "a" or "an" preceding an element does not exclude the presence of a plurality of such elements;

c) any reference signs in the claims do not limit their scope;

d) any of the disclosed devices or portions thereof may be combined together or separated into further portions unless specifically stated otherwise; and e) no specific sequence of acts or steps is intended to be required unless specifically indicated.

The invention claimed is:

1. An interactive system for storing, securing, and retrieving products, comprising:

a shelving device having a plurality of slots;

one or more storage boxes adapted to be inserted into any of said slots, wherein each of the storage boxes has a unique ID, and each of the storage boxes contains a product associated with a unique product ID;

a processor configured to associate the unique ID of the storage box with the unique product ID, to associate the unique ID of the storage box with a slot location after a sensor detected that the storage box is fully inserted in one of the slots, and to release the storage box from the interactive system for further use by disassociating the unique ID of the storage box with the unique product ID, and disassociating the unique ID of the storage box with the slot location after the product of the storage box is removed;

at least one ID reader configured to read the unique product ID and automatically unlock the storage box that contains the product associated with the unique product ID; and at least one lock configured to lock the storage box when the storage box is fully inserted into one of the slots.

2. The interactive system for storing, securing, and retrieving products of claim 1, wherein said processor is connected to at least one of said slot, said ID reader, and said lock.

3. The interactive system for storing, securing, and retrieving products of claim 1, wherein said processor contains algorithms for controlling system electronics and said lock of the system.

4. The interactive system for storing, securing, and retrieving products of claim 1, further comprising audio or visual indicators associated with each slot, the audio or visual indicators are capable of indicating status of the storage boxes.

5. The interactive system for storing, securing, and retrieving products of claim 1, wherein said unique ID can be selected from the group consisting of bar code, RFID, mechanical ID, and combination thereof.

6. The interactive system for storing, securing, and retrieving products of claim 1, wherein said ID reader can be selected from the group consisting of bar code reader, RFID reader, and mechanical ID reader.

7. The interactive system for storing, securing, and retrieving products of claim 4, wherein said ID reader further comprises an antenna.

8. The interactive system for storing, securing, and retrieving products of claim 1, wherein said product can be selected from the group consisting of drugs, corpses, food stuffs, jewels, samples, plants, traditional Chinese products, herbs, and animals.

9. A method for storing, securing, and retrieving products, comprising the steps of:

making at least one storage box available;

engaging said at least one storage box, each of the storage boxes has a unique ID and each of the storage boxes contains a product associated with a unique product ID;

inserting said storage box in any of a plurality of slots of a shelving device;

locking said storage box in said slot when the storage box is fully inserted in the slot;

associating the unique ID of the storage box with the unique product ID, and associating the unique ID of the storage box with a slot location after the sensor detected that the storage box is fully inserted in one of the slots, and releasing the storage box from the interactive system for further use by disassociating the unique ID of the storage box with the unique product ID, and disassociating the unique ID of the storage box with the slot location after the product of the storage box is removed;

unlocking said storage box that contains the product associated with the unique product ID when the unique product ID is read by an ID reader; and removing the product from one of said storage box.

10. The method for storing, securing, and retrieving products of claim 9, further comprising the step, following removing product from said storage box, of delivering said product.

11. The method for storing, securing, and retrieving products of claim 10, wherein delivery is made to a patient.

12. The method for storing, securing, and retrieving products of claim 9, further comprising the step of, following locking said storage box in said slot, turning on a visual or audio indicator.

13. The method for storing, securing, and retrieving products of claim 9, wherein making storage box available comprises emptying the storage box of products or partially emptying the storage box of products.

14. The method for storing, securing, and retrieving products of claim 9, wherein engaging said storage box comprises scanning the unique ID of said storage box.

15. The method for storing, securing, and retrieving products of claim 9, wherein locking said storage box is automatically controlled by a processor.

16. The method for storing, securing, and retrieving products of claim 9, wherein unlocking said storage box is automatically controlled by a processor.

17. The interactive system for storing, securing, and retrieving products of claim 1, wherein a customer is assigned with a unique customer ID, and the ID of the said customer is associated with the ID of the product.

18. The method for storing, securing, and retrieving products of claim 9, further comprising:

assigning a customer with a unique customer ID, and associating the unique customer ID with the unique product ID.

* * * * *